US012313574B1

United States Patent
Liu et al.

(10) Patent No.: US 12,313,574 B1
(45) Date of Patent: May 27, 2025

(54) COINCIDENCE TECHNIQUE-BASED X-RAY DETECTION DEVICE AND COMPOSITION ANALYSIS METHOD

(71) Applicants: SHANDONG UNIVERSITY, Weihai (CN); WEIHAI RESEARCH INSTITUTE OF INDUSTRIAL TECHNOLOGY OF SHANDONG UNIVERSITY, Weihai (CN)

(72) Inventors: Chen Liu, Weihai (CN); Shouyu Wang, Weihai (CN); Guangzhi Li, Weihai (CN); Yong Wang, Weihai (CN); Bingying Xia, Weihai (CN)

(73) Assignees: SHANDONG UNIVERSITY, Weihai (CN); WEIHAI RESEARCH INSTITUTE OF INDUSTRIAL TECHNOLOGY OF SHANDONG UNIVERSITY, Weihai (CN)

( * ) Notice: Subject to any disclaimer, the term of this patent is extended or adjusted under 35 U.S.C. 154(b) by 0 days.

(21) Appl. No.: 19/018,811

(22) Filed: Jan. 13, 2025

Related U.S. Application Data

(63) Continuation of application No. PCT/CN2024/095688, filed on May 28, 2024.

(30) Foreign Application Priority Data

May 11, 2024 (CN) .......................... 202410579670.7

(51) Int. Cl.
*G01N 23/223* (2006.01)
*G01N 23/22* (2018.01)
(Continued)

(52) U.S. Cl.
CPC .......... *G01N 23/223* (2013.01); *G01N 23/22* (2013.01); *G01T 1/172* (2013.01); *G01T 1/24* (2013.01);
(Continued)

(58) Field of Classification Search
CPC ........ G01N 23/22; G01N 23/223; G01T 1/24; G01T 1/28; G01T 1/36; G01T 1/366
(Continued)

(56) References Cited

U.S. PATENT DOCUMENTS 3,919,548 A * 11/1975 Porter ................. G01N 23/2204
378/45
3,928,766 A * 12/1975 Clausen ................... G21K 1/00
378/45
(Continued)

FOREIGN PATENT DOCUMENTS

CN 1354832 A 6/2002
CN 101281147 A 10/2008
(Continued)

OTHER PUBLICATIONS

International Search Report for PCT/CN2024/095688.
(Continued)

*Primary Examiner* — Allen C. Ho

(57) ABSTRACT

A coincidence technique-based X-ray detection device and composition analysis method are provided, wherein the X-ray detection device includes: a sample holding device; an excitation unit for outputting X-rays with continuously adjustable energy; detectors comprising two SiC semiconductor detectors and two SiPIN semiconductor detectors; a signal processing unit for performing amplification, analog-to-digital conversion and classification on the detected signals to obtain energy information; a data processing device connected to the signal processing unit and used for analysis and calculation according to the energy information and determining element type and content of the sample to be tested, wherein the data processing device comprises a processor and a memory, the processor is used for executing following program modules stored in the memory: a storage module, a baseline recovery module, a calibration curve
(Continued)

construction module, an extraction module, an effective energy information determination module, and a peak comparison module.

14 Claims, 3 Drawing Sheets

(51) Int. Cl.
    *G01T 1/172*     (2006.01)
    *G01T 1/24*     (2006.01)
    *G01T 1/28*     (2006.01)
    *G01T 1/36*     (2006.01)
    *G01T 1/38*     (2006.01)

(52) U.S. Cl.
    CPC ............... *G01T 1/28* (2013.01); *G01T 1/361* (2013.01); *G01T 1/366* (2013.01); *G01T 1/368* (2013.01); *G01T 1/38* (2013.01)

(58) Field of Classification Search
    USPC ..................................... 378/44–50
    See application file for complete search history.

(56) References Cited

U.S. PATENT DOCUMENTS

| | | | | |
|---|---|---|---|---|
| 4,388,530 A * | 6/1983 | Lubecki | ............... | G01N 23/223 378/45 |
| 4,916,719 A * | 4/1990 | Kawatra | ............... | G01N 23/12 378/46 |
| 5,044,001 A * | 8/1991 | Wang | ............... | H01J 35/00 378/45 |
| 6,130,931 A * | 10/2000 | Laurila | ............... | G01N 23/223 378/45 |
| 6,389,102 B2 * | 5/2002 | Mazor | ............... | G01T 1/247 378/50 |
| 6,421,415 B1 * | 7/2002 | Peczkis | ............... | G01N 23/2206 378/53 |
| 6,522,718 B2 * | 2/2003 | Sato | ............... | G01B 15/02 378/50 |
| 6,810,106 B2 * | 10/2004 | Sato | ............... | G01N 23/223 378/50 |
| 6,907,107 B1 | 6/2005 | Wallis | | |
| 7,200,200 B2 * | 4/2007 | Laurila | ............... | G01N 23/223 378/45 |
| 7,233,643 B2 * | 6/2007 | Sipilä | ............... | G01N 23/223 378/45 |
| 7,529,337 B2 * | 5/2009 | Matoba | ............... | G01N 23/223 378/45 |
| 8,049,178 B2 * | 11/2011 | Lynn | ............... | G01T 1/24 250/361 R |
| 9,791,393 B2 * | 10/2017 | Sako | ............... | G01N 23/223 |
| 11,796,690 B2 * | 10/2023 | Maerten | ............... | G01T 1/20 |
| 11,953,455 B1 | 4/2024 | Liu | | |

FOREIGN PATENT DOCUMENTS

| | | |
|---|---|---|
| CN | 116895711 A | 10/2023 |
| CN | 118156358 A | 6/2024 |
| WO | WO2023236540 A1 | 12/2023 |

OTHER PUBLICATIONS

Search Report of the priority application CN202410579670.7.
NPL: "γ-ray Detector Based on 4H—SiC Schottky barrier diode", Acta Phys. Sin. vol. 65, No. 20 (2016) 207301.

* cited by examiner

COINCIDENCE TECHNIQUE-BASED X-RAY DETECTION DEVICE AND COMPOSITION ANALYSIS METHOD This application is a continuation of the international application PCT/CN2024/095688, filed on May 28, 2024, which claims priority to Chinese Patent Application No. 202410579670.7 filed on May 11, 2024 and entitled "SiC semiconductor detector, ore composition analysis device and method", the disclosure of the above identified applications is hereby incorporated by reference in its entirety.

TECHNICAL FIELD

The present application belongs to the technical field of composition analysis, and in particular to a coincidence technique-based x-ray detection device and a composition analysis method.

BACKGROUND ART

Ore composition analysis is a key process for in-depth research on unknown ores and their compositions. It aims to quickly and accurately determine various constituent elements in the target ore sample and conduct rapid qualitative and quantitative analysis. Traditional ore composition analysis technology usually uses X-ray fluorescence analysis method, which obtains element information of the sample by detecting the X-ray fluorescence generated by the sample. However, in this field, there are a series of challenges, such as sample complexity, analysis speed and accuracy.

SUMMARY

In view of at least one shortcoming existed in the prior art, the present application provides a coincidence technique-based x-ray detection device and a composition analysis method.

A first aspect of the present application provides a coincidence technique-based X-ray detection device, comprising:
- a sample holding device, which is used for holding a sample to be detected;
- an excitation unit, which is arranged above the sample holding device and is configured to output X-rays with continuously adjustable energy that interact with the sample to be detected, so as to excite the sample and generate secondary X-rays;
- detectors, which are configured to detect signals of the secondary X-rays; the detectors comprise two SiC semiconductor detectors and two SiPIN semiconductor detectors, and the four detectors are spaced apart and are arranged circumferentially around the sample holding device;
- a signal processing unit, which is configured to perform amplification, analog-to-digital conversion and classification on the detected signals to obtain energy information;
- a data processing device, which is connected to the signal processing unit and is configured to perform analysis and calculation according to the energy information and determine element type and content in the sample to be tested; the data processing device comprises a processor and a memory, and the processor is configured to execute following program modules stored in the memory:
- a storage module, which is configured to store known elements and X-ray energy information of the known elements;
- a baseline recovery module, which is configured to perform baseline recovery according to an average value and a median value of energies in the energy information to obtain true amplitude energy information so as to eliminate the baseline drift;
- a calibration curve construction module, which is configured to construct a calibration curve according to peak positions and peak energies of known standard samples;
- an extraction module, which is configured to extract peak positions and peak energies in the true amplitude energy information, wherein a threshold is set in the extraction module, and energies in the true amplitude energy information that reach or exceed the threshold are considered to be peaks;
- an effective energy information determination module, which is configured to extract time information of the four semiconductor detectors, and take a time point when a first energy in the true amplitude energy information reaches or exceeds the threshold as an initial time, select a time window, and the true amplitude energy information within the time window is considered to be effective energy information;
- a peak comparison module, which is configured to compare the effective energy information with the X-ray energy information of the known elements in the calibration curve to determine the element type and content in the sample.

In some embodiments of the first aspect, the baseline recovery module is configured to end calculation loop when the median value and the average value of the energies satisfy following formula:

$$|B_{ave} - B_{med}| < \delta_B$$

where $B_{ave}$ is the average value of the energies, $B_{med}$ is the median value of the energies, $\delta_B$ is a minimum difference with values ranging from 0.1 to 1; when the median value and the average value satisfy the above formula, take the median value or the average value as a baseline level, and subtract the median value or the average value from the energies to obtain the true amplitude energy information; when the above formula is not satisfied, $\delta_B$ times of data is deducted from original data set and then the calculation loop is repeated until the above formula is satisfied.

In some embodiments of the first aspect, the storage module further stores X-ray intensity ratios at different energy levels for the known elements, and the processor is further configured to execute following program modules stored in the memory:
- a calculation module, which is configured to calculate intensity ratios of each element relative to other elements in the sample to be detected according to X-ray peak of each element;
- an intensity fingerprint comparison module, which is configured to match the calculated intensity ratios with the X-ray intensity ratios at different energy levels for the known elements to correct the element type and relative content of each element.

In some embodiments of the first aspect, the data processing device is a host computer, and a display module is also provided in the host computer, the display module is connected to the intensity fingerprint comparison module, and the display module is configured to display the element type and relative content of each element.

In some embodiments of the first aspect, the sample holding device comprises:
a sample container, which is used for holding the sample to be tested;
a sliding unit, which comprises a slide groove arranged at an edge of the sample container and four sliding members arranged at intervals; bottoms of the sliding members are placed in the slide groove and are capable of sliding along the slide groove, the four detectors are respectively installed on the four sliding members.

In some embodiments of the first aspect, the excitation unit comprises:
a power supply, which is used to output different voltages;
a controllable X-ray excitation source, which is electrically connected to the power supply and is configured to output X-rays with continuously adjustable energy according to different voltages output by the power supply, so that the X-rays interact with the sample to be tested and excite the sample to generate the secondary X-rays.

In some embodiments of the first aspect, the signal processing unit comprises:
a preamplifier, which is configured to amplify the secondary X-rays detected by the detectors;
a multichannel pulse amplitude analyzer, which is configured to perform analog-to-digital conversion and classification on amplified secondary X-rays to obtain the energy information of the secondary X-rays, wherein the energy information comprises counts and energies of the secondary X-rays.

In some embodiments of the first aspect, the signal processing unit further comprises a filter connected between the preamplifier and the multichannel pulse amplitude analyzer, and the filter adopts moving average filtering and is configured to take an average value of a total of N points prior to an amplitude value at current moment as a filtered value at the current moment, and specific formula is as follows:

$$y_n = \frac{1}{N}\sum_{m=0}^{N-1} x_{n-m}$$

$x_n$ represents a discrete sequence of samples, $y_n$ represents a corresponding filtered data sequence, and N represents a number of points for calculating the average value.

In some embodiments of the first aspect, each of the SiC semiconductor detectors comprises:
an ohmic electrode;
a 4H-SiC single crystal substrate, which is disposed on an upper surface of the ohmic electrode;
a buffer layer, which is grown on an upper surface of the 4H-SiC single crystal substrate, a doping concentration of the buffer layer is $1\times10^{18}$ $cm^{-3}$, and the buffer layer is made of same material as the 4H-SiC single crystal substrate;
an epitaxial layer, which is grown on an upper surface of the buffer layer, a doping concentration of the epitaxial layer is $5\times10^{14}$ $cm^{-3}$, and the epitaxial layer is made of same material as the 4H-SiC single crystal substrate;
a sensitive layer, which is a Schottky contact layer formed by evaporating a Ni film electrode on an upper surface of the epitaxial layer by vacuum-thermal chemical vapor deposition method;

wherein a cross section of the sensitive layer is a square of 7 mm×7 mm, and a cross section of each of the 4H-SiC single crystal substrate, the ohmic electrode, the buffer layer and the epitaxial layer is a square of 10 mm×10 mm.

In some embodiments of the first aspect, a preparation method of the ohmic electrode is: selecting Ni and Pt materials, using vacuum evaporation and magnetron sputtering to prepare a Ni/Pt ohmic contact electrode with a Ni layer thickness of 80 nm and a Pt layer thickness of 100 nm, and annealing at 900° C. for 2 minutes in a vacuum chamber through a rapid thermal annealing system to obtain the ohmic electrode.

In some embodiments of the first aspect, the 4H-SiC single crystal substrate has a thickness of 350 μm and a resistivity of 0.023 Ω·cm, the buffer layer has a thickness of 0.5 μm, the epitaxial layer has a thickness of 30 μm, and the sensitive layer has a thickness of 80 nm.

A second aspect of the present application provides a composition analysis method, which uses the coincidence technique-based X-ray detection device according to the first aspect, comprising following steps:
S1, emitting X-rays with continuously adjustable energy to a sample to be tested, and the X-rays of different energies interact with the sample and excite the sample to generate secondary X-rays of different energies;
S2, detecting the secondary X-rays by two SiC semiconductor detectors and two SiPIN semiconductor detectors that are spaced apart, performing amplification, analog-to-digital conversion and classification on the secondary X-rays to obtain energy information of the secondary X-rays, wherein the energy information comprises counts and energies of the secondary X-rays;
S3, performing baseline recovery according to an average value and a median value of the energies in the energy information to obtain true amplitude energy information, so as to eliminate baseline drift;
S4, constructing a calibration curve according to peak positions and peak energies of known standard samples;
S5, extracting peak positions and peak energies in the true amplitude energy information, and during extracting process, setting a threshold value, and considering energies in the true amplitude energy information that reach or exceed the threshold peaks to be peaks;
S6, extracting time information of the four semiconductor detectors, taking a time point when a first energy in the true amplitude energy information reaches or exceeds the threshold as an initial time, selecting a time window, and considering the true amplitude energy information within the time window to be effective energy information;
S7, comparing the effective energy information with X-ray energy information of known elements in the calibration curve to determine element type and content in the sample.

In some embodiments of the second aspect, in step S3, ending calculation loop when the median value and average value of the energies satisfy following formula:

$$|B_{ave} - B_{med}| < \delta_B$$

where $B_{ave}$ is the average value of the energies, $B_{med}$ is the median value of the energies, $\delta_B$ is a minimum difference with values ranging from 0.1 to 1; when the median value and the average value satisfy the above formula, taking the median value or the average value as a baseline level, and subtract the median value or the average value from the energies to obtain the true amplitude energy information; when the above formula is not satisfied, $\delta_B$ times of data is deducted from original data set and the calculation loop is repeated until the above formula is satisfied.

In some embodiments of the second aspect, the method further comprises step S8: calculating intensity ratios of each element relative to other elements in the sample to be detected according to X-ray peak of each element, and matching the calculated intensity ratios with X-ray intensity ratios at different energy levels for the known elements to correct the element type and relative content of each element.

Compared with the prior art, the advantages and positive effects of the present application are as follows.

(1) The coincidence technique-based X-ray detection device provided in at least one embodiment of the present application, adopts two SiC semiconductor detectors and two SiPIN semiconductor detectors, with a total of four channels, which fully utilizes the advantages of both SiC semiconductor detectors and SiPIN semiconductor detectors, and can simultaneously detect X-rays in different energy ranges, making the analysis more comprehensive and sensitive, and can capture a wider range of element signals, greatly improving the accuracy of element determination, and bringing new breakthroughs to the field of composition analysis.

(2) The coincidence technique-based X-ray detection device provided in at least one embodiment of the present application, has a sample holding device that is independently designed and comprising a sample container and a sliding unit. Through the sliding unit, the position of the semiconductor detectors provided on the sample container can be changed to detect the secondary X-rays generated by the X-ray excitation of the sample to be tested from multiple directions, solving the measurement deviation caused by the uneven distribution of various elements inside the sample, and making the measurement result more accurate.

(3) The coincidence technique-based X-ray detection device provided in at least one embodiment of the present application, eliminates baseline drift through the baseline recovery module to obtain true amplitude energy information, thereby avoiding the influence of leakage current in the detectors, temperature drift of electronic compositions, and environmental noise interference, thereby improving the accuracy of composition analysis.

(4) The coincidence technique-based X-ray detection device provided in at least one embodiment of the present application, selects energy information within a time window as effective energy information through the effective energy information determination module, and can select effective energy information from a large number of signals detected by four semiconductor detectors for analysis, thereby reducing the impact of noise on the analysis work and improving efficiency.

(5) The coincidence technique-based X-ray detection device provided in at least one embodiment of the present application, can establish a unique "intensity fingerprint" of each element by analyzing the intensity ratio of the X-ray energy level, and use the "intensity fingerprint" of each element as a powerful identification feature in another dimension, so that the composition analysis no longer relies solely on the energy information of the X-ray, and can more comprehensively and reliably determine the elements in the sample.

(6) The coincidence technique-based X-ray detection device provided in at least one embodiment of the present application, improves the structure of the SiC semiconductor detector; compared with the traditional SiC semiconductor detector, the sensitive layer is a Schottky contact layer formed by evaporating a Ni film electrode on the upper surface of the epitaxial layer using a vacuum-thermal chemical vapor deposition method, and the cross-sectional areas of the sensitive layer and the ohmic electrode are increased, which can achieve a low leakage current of $10^{-12}$ A, an ideal factor of 1.17 which close to 1 and a high rectification ratio of $10^{10}$, reduce dark current, have high reliability, have a large saturated electron mobility, and can improve the charge response speed of the SiC semiconductor detector. Therefore, the detectors can detect X-rays quickly and accurately.

(7) The coincidence technique-based X-ray detection device provided in at least one embodiment of the present application, adopts the SiC semiconductor detectors having a large bandgap width and good radiation resistance at room temperature, and an extremely high breakdown electric field strength, so that the SiC semiconductor detectors can withstand high voltage and high current density and has a good signal-to-noise ratio.

(8) The coincidence technique-based X-ray detection device provided in at least one embodiment of the present application, adopts the SiC semiconductor detectors having high thermal conductivity, which is 3 times that of Si, good heat dissipation and stable chemical properties. It can quickly and accurately detect X-rays even under high temperature conditions.

(9) The composition analysis method provided in at least one embodiment of the present application, uses the coincidence technique-based X-ray detection device to perform composition analysis, which can simultaneously detect X-rays in different energy ranges, eliminate the influence of baseline drift, select effective energy information for analysis, and improve the accuracy and efficiency of composition analysis.

(10) The composition analysis method provided in at least one embodiment of the present application can more accurately infer the existence and relative content of multiple elements in a sample by considering the intensity ratio information of each element, so that the composition analysis is no longer solely dependent on the energy information of X-rays, and can more comprehensively and reliably determine the elements present in the sample.

In the figures:
1, sample holding device; 11, sample container; 12, slide groove; 13, sliding member; 131, sliding post;
2, excitation unit; 201, power supply; 202, controllable X-ray excitation source;

3, detector; 31, SiC semiconductor detector; 311, ohmic electrode; 312. 4H-SiC single crystal substrate; 313. buffer layer; 314, epitaxial layer; 315, sensitive layer; 32, SiPIN semiconductor detector;
4, signal processing unit; 401, preamplifier; 402, multi-channel pulse amplitude analyzer; 403, filter;
5, data processing device; 50, host computer; 501, processor; 502, memory; 51, storage module; 52, baseline recovery module; 53, calibration curve construction module; 54, extraction module; 55, effective energy information determination module; 56, peak comparison module; 57, calculation module; 58, intensity fingerprint comparison module; 59, display module.

DETAILED DESCRIPTION

Hereinafter, the present application will be described in detail through exemplary embodiments. However, it should be understood that without further description, elements, structures and features in one embodiment may also be beneficially combined into other embodiments.

A first aspect of the present application provides a coincidence technique-based X-ray detection device.

Figure 1:
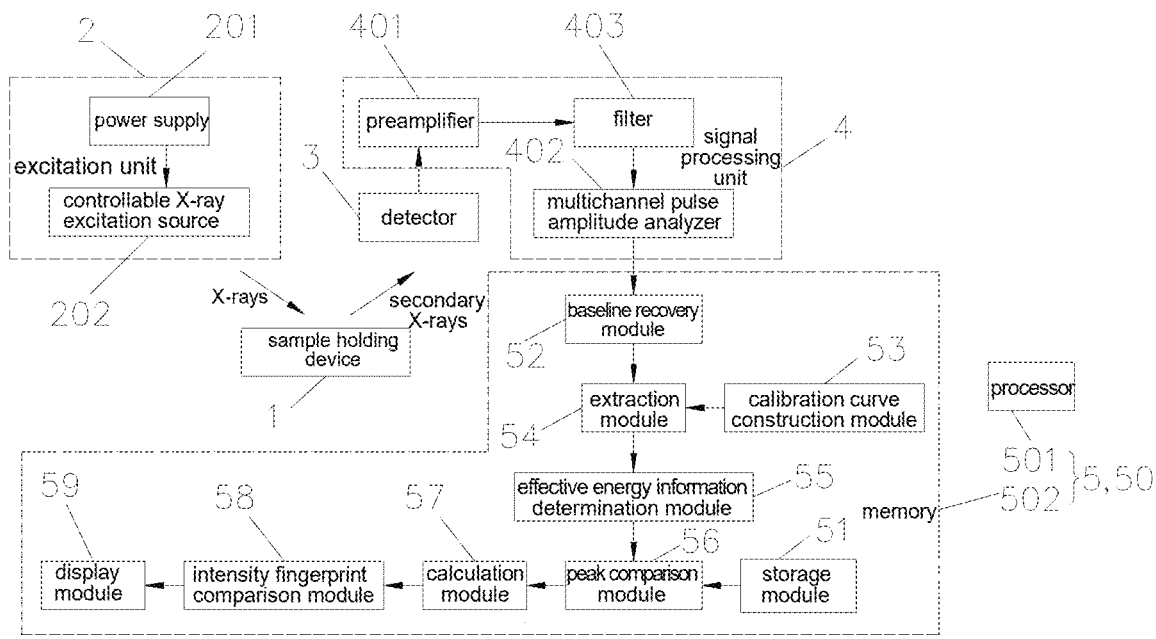
FIG. 1 is a structural block diagram of a coincidence technique-based X-ray detection device in an embodiment of the present application.

In some embodiments, as shown in FIG. 1, a coincidence technique-based X-ray detection device comprises:
a sample holding device 1, which is used for holding a sample to be detected;
an excitation unit 2, which is arranged above the sample holding device 1 and is configured to output X-rays with continuously adjustable energy, so that the X-rays interact with the sample to be detected to excite and generate secondary X-rays;
detectors 3, which are configured to detect signals of the secondary X-ray; the detectors 3 comprise two SiC semiconductor detectors 31 and two SiPIN semiconductor detectors 32, and the four detectors are spaced apart and arranged circumferentially around the sample holding device;
a signal processing unit 4, which is configured to perform amplification, analog-to-digital conversion and classification on the detected signals to obtain energy information;
a data processing device 5, which is connected to the signal processing unit 4 and is configured to perform analysis and calculation according to the energy information and determine element type and content in the sample to be tested; the data processing device 5 comprises a processor 501 and a memory 502, and the processor 501 is configured to execute the following program modules stored in the memory 502:
a storage module 51, which is configured to store known elements and X-ray energy information of the known elements;
a baseline recovery module 52, which is configured to perform baseline recovery according to an average value and a median value of energies in the energy information to obtain true amplitude energy information, so as to eliminate baseline drift;
a calibration curve construction module 53, which is configured to construct a calibration curve according to peak positions and peak energies of known standard samples;
an extraction module 54, which is configured to extract peak positions and peak energies in the true amplitude energy information; to avoid missing peaks and ensure the accuracy of the composition analysis, a threshold is set in the extraction module 54, and energies in the true amplitude energy information that reach or exceed the threshold are considered to be peaks;
an effective energy information determination module 55, which is configured to extract time information of the four semiconductor detectors, take a time point when a first peak appears as an initial time, select a time window, and the true amplitude energy information within the time window is considered to be effective energy information; the effective energy information comprises the peak positions and peak energies extracted by the extraction module;
a peak comparison module 56, which is configured to compare the effective energy information with the X-ray energy information of the known elements in the calibration curve to determine the element type and content in the sample.

The X-ray detection device provided in the aforementioned embodiment of the present application is based on coincidence technology, and adopts SiC semiconductor detectors and SiPIN semiconductor detectors, each type of detector has two channels, with a total of four channels, giving full play to the advantages of both SiC semiconductor detectors and SiPIN semiconductor detectors, and can simultaneously detect X-rays in different energy ranges, breaking through the limitations of traditional technology. Compared with traditional single-channel measurement in ore analysis, the analysis achieved by the present application is more comprehensive and sensitive, and can capture a wider range of element signals, greatly improving the accuracy of element determination, and bringing new breakthroughs to the field of composition analysis.

The present application realizes noise reduction, enhanced adaptability and real-time online analysis by introducing multichannel coincidence technology in the detection device. Specifically, through the synergy among the channels, the noise and interference caused by sample characteristics, geometric shapes or instruments are reduced, and the signal-to-noise ratio is improved. The multichannel coincidence technology makes the detection device more flexible and able to meet the requirements of different types of ores and composition analysis, and provides more powerful and accurate analysis capabilities for complex samples, especially samples containing multiple elements. The adoption of multichannel coincidence technology makes the analysis process more efficient, and can perform online analysis in real time and continuously, providing practical application possibilities for real-time process control and quality monitoring.

The SiC semiconductor detectors and the SiPIN semiconductor detectors used in the present application can be the existing ones available on the market, wherein the SiC semiconductor detector is a detector made of SiC material and can be used to detect X-rays, while the SiPIN semiconductor detector is a detector with a PIN junction formed in a Si substrate and can also be used to detect X-rays. The present application does not impose restrictions on the specific structures of the detectors.

Due to the influences such as leakage current in the detectors, temperature drift of electronic compositions and interference from environmental noise, the collected pulse signals are always superimposed on an unstable baseline, which is called baseline drift. Baseline drift will change the amplitude of pulses, and the amplitude of the pulses carries a lot of basic information. Assuming that the baseline remains unchanged in the selected data set, the data set contains only one signal waveform, and there is a section of baseline data in front of the signal. This baseline is usually consists of several hundred sampling points, and the baseline value of each event can be calculated separately through these baseline data.

To solve the above problem, the X-ray detection device described in the embodiment of the present application is provided with the baseline recovery module, through which the baseline is recovered using the average value and median value of energies in the energy information to obtain the true amplitude energy information, so as to eliminate the baseline drift. Specifically, the baseline recovery module 52 is configured as follows: calculate the absolute value of the difference between the average value and the median value of the energies in the energy information and stop calculation when the following formula is satisfied, and at this point either the average value or the median value can be used to estimate the baseline level:

$$|B_{ave} - B_{med}| < \delta_B$$

where $B_{ave}$ is the average value of the energies, $B_{med}$ is the median value of the energies, $\delta_B$ is a minimum difference (a parameter of the above formula) with values ranging from 0.1 to 1. The smaller the value of $\delta_B$ is, the longer the calculation time will be, and the accuracy of the baseline estimate determined by the algorithm will be redundant. The larger the value of $\delta_B$ is, the less accurate the baseline estimate will be. When the median value and the average value satisfy the above formula, take the median value or the average value as the baseline level, and subtract the median value or the average value from the energies in the energy information to obtain the true amplitude energy information. When the above formula is not satisfied, $\delta_B$ times of data is deducted from the original data set and then the calculation loop is repeated until the formula is satisfied.

When the calibration curve construction module constructs the calibration curve, energy calibration is performed. By measuring the standard samples with known energies, an energy calibration curve, that is, a calibration curve, is established. Through the peak comparison module 56, the peaks can be matched to a specific X-ray energy by using the calibration curve to determine the element type. When constructing the calibration curve, it is necessary to use standard samples with known elements and energies corresponding to peaks. By recording the peak positions and peak energies of the standard sample, a calibration curve is established, and the calibration curve can be referred to when energy calibration is performed on the peaks of the energy information.

In the X-ray detection device provided in the present application, when analyzing the true amplitude energy information, a threshold is set, and when the energy reaches or exceeds the threshold, it is considered to be a peak. By setting the threshold to identify the peak, the detected signals of peaks will not be omitted and the accuracy of the composition analysis can be ensured. Typically, the threshold can be set as the mean value of the background noise plus several times the standard deviation (for example, 3σ or 5σ). In this way, most of the background noise can be excluded and only significant signals are retained. Alternatively, the threshold can also be directly determined from preliminary experiments as a value that can clearly distinguish between signals and noise.

In the effective energy information determination module 55, a time window is selected, and the true amplitude energy information with energies that reaches or exceeds the threshold detected by the four semiconductor detectors within the time window is collected as effective energy information for analysis. Effective energy information can be selected from a large number of signals detected by the four semiconductor detectors for analysis, thereby reducing the impact of noise on the analysis work and improving efficiency. The length of the time window is determined based on the time resolution of the detector and signal characteristics. Typically, the time window can be set between tens of nanoseconds and hundreds of nanoseconds. The typical duration of the signals can be determined through preliminary experiments. For example, if the signals basically decay within 20 nanoseconds, a time length of 20 to 50 nanoseconds can be selected as the time window.

The X-ray detection device described in the embodiment of the present application constructs a calibration curve through the calibration curve construction module, extracts energy information of the peaks of the true amplitude energy information through the extraction module, and compares the corresponding relationship between the calibration curve and the X-ray energy information of known elements through the peak comparison module. The effective energy information is determined through the effective energy information determination module to reduce irrelevant events, thereby reducing noise and improving test accuracy.

In some embodiments, referring to FIG. 1, the storage module 51 further stores X-ray intensity ratios at different energy levels for the known elements, and the processor 501 is further configured to execute the following program modules stored in the memory 502:

a calculation module 57, which is configured to calculate intensity ratios of each element relative to other elements in the sample to be detected according to X-ray peak of each element;

an intensity fingerprint comparison module 58, which is configured to match the calculated intensity ratios of each element with the X-ray intensity ratios at different energy levels for the known elements to correct the element type and relative content of each element.

Traditional X-ray fluorescence analysis mainly relies on the energy information of X-rays in the energy spectrum to identify elements, and can only perform identification within a single dimension. In the above embodiments of the present application, by analyzing the intensity ratios of X-ray energy levels, a unique "intensity fingerprint" of each element can be established, and the "intensity fingerprint" of each element can be used as a powerful identification feature in another dimension, so that composition analysis no longer relies solely on the energy information of X-rays. The intensity ratio provides additional dimensions that can more comprehensively and reliably determine the elements present in the sample. For samples containing multiple elements, the intensity ratios of the X-ray energy levels of each element can be used to more accurately analyze the existence and relative content of the elements, providing a more detailed solution for the analysis of complex samples.

In some embodiments, the calculation module 57 is configured to normalize intensity of the X-ray peak of each element before calculating the intensity ratio. The intensity fingerprint comparison module 58 can be used to perform the intensity ratio matching by using methods such as least square method or the correlation coefficient method.

In some embodiments, as shown in FIG. 1, the data processing device 5 further comprises a display module 59, which is connected to the intensity fingerprint comparison module 58 and is used to display the element type and relative content of each element. The display mode can be presented in the form of icons or reports. The display module 59 can specifically be a display.

In some embodiments, the data processing device 5 is a host computer 50, which is configured with the above processor 501 and the memory 502, and the memory 502 stores the above storage module 51, the baseline recovery module 52, the calibration curve construction module 53, the extraction module 54, the effective energy information determination module 55, the peak comparison module 56, the calculation module 57 and the intensity fingerprint comparison module 58.

In some embodiments, the detectors 3 are slidably connected to the sample holding device 1, so that the positions of the detectors 3 relative to the sample holding device 1 are adjustable. Specifically, in one embodiment shown in FIG. 2, the sample holding device 1 comprises:

- a sample container 11, which is used for holding the sample to be tested;
- a sliding unit, which comprises a slide groove 12 arranged at an edge of the sample container and four sliding members 13 arranged at intervals, bottoms of the sliding members 13 are placed in the slide groove 12 and are capable of sliding along the slide groove 12, and the four detectors 3 are respectively mounted on the four sliding members 13. Optionally, the sliding members 13 are sliding posts 131, with the detectors 3 installed thereon, respectively, and the bottom ends of the sliding posts 131 are inserted into the slide groove 12 and can slide relative to the slide groove 12.

By adjusting the positions of the sliding members in the slide groove to adjust the positions of the semiconductor detectors, X-rays in different energy ranges can be detected simultaneously. When performing composition analysis, the secondary X-rays generated by the sample to be tested when excited by X-rays can be detected from different angles, making the analysis more comprehensive and sensitive.

Figure 2:
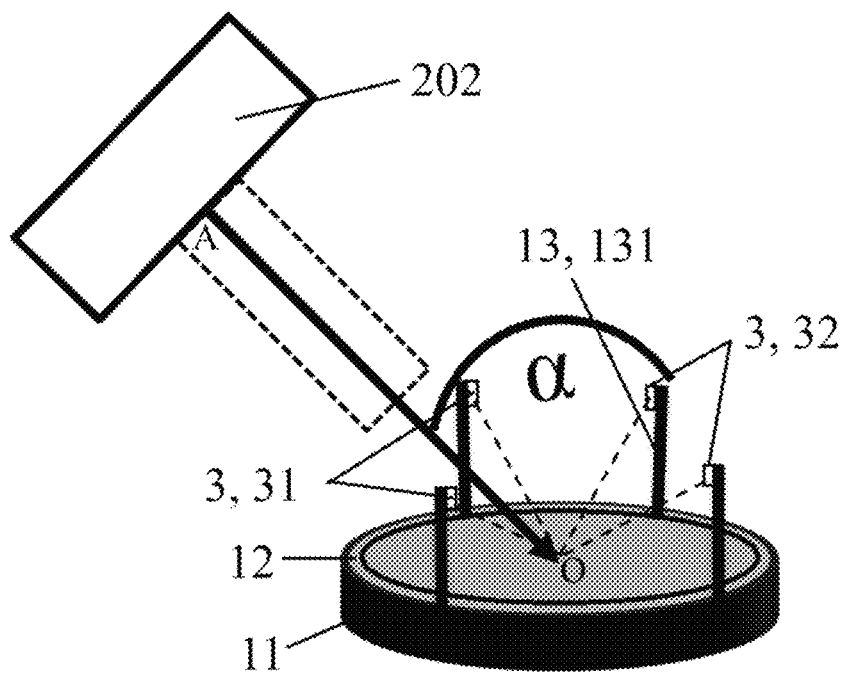
FIG. 2 is a structural schematic diagram of a sample holding device of the coincidence technique-based X-ray detection device in the embodiment of the present application.

In some embodiments, as shown in FIG. 2, the excitation unit 2 (specifically, a controllable X-ray excitation source 202), the sample holding device 1 and at least one of the detectors 3 are arranged at an angle α, and the value of the angle α can be selected according to actual needs. Specifically, the angle α is an included angle formed by a connecting line between a X-ray output port A of the excitation source 202 and a center O of the sample container 11 and a connecting line between the center O of the sample container 11 and the detector 3. For example, the angle α can be 45°, 135°, 60°, 90°, 120°, etc., and can be adjusted by changing the positions of the detector 3 and the excitation unit 2. The SiC semiconductor detectors and the SiPIN semiconductor detectors are arranged at an angle with the excitation unit 2 and the sample holding device 1, which can ensure that the sample to be tested can be effectively excited by the X-rays on the one hand, and the secondary X-rays generated by the excitation can be fully absorbed by the SiC semiconductor detectors and the SiPIN semiconductor detectors on the other hand.

In some embodiments, referring to FIG. 1, the excitation unit 2 comprises:

- a power supply 201, which is used for outputting different voltages;
- a controllable X-ray excitation source 202, which is electrically connected to the power supply 201 and is configured to output X-rays with continuously adjustable energy according to different voltages output by the power supply, so that the X-rays interact with the sample to be tested and excite the sample to generate the secondary X-rays.

Specifically, the power supply and the controllable X-ray excitation source are those known in the market. By adjusting the voltage, the controllable X-ray excitation source can output X-rays with continuously adjustable energy, which can excite the elements in the sample to achieve multi-element determination.

In some embodiments, referring to FIG. 1, the signal processing unit 4 comprises:

- a preamplifier 401, which is connected to the detectors 3 and is configured to amplify the secondary X-rays detected by the detectors;
- a multichannel pulse amplitude analyzer 402, which is connected to the preamplifier 401 and is configured to perform analog-to-digital conversion and classification on amplified secondary X-rays to obtain energy information of the secondary X-rays, wherein the energy information comprises counts and energies of the secondary X-rays.

Specifically, the preamplifier and the multichannel pulse amplitude analyzer adopt the preamplifier and the multichannel pulse amplitude analyzer known in the market.

In some embodiments, referring to FIG. 1, the signal processing unit 4 further comprises a filter 403 connected between the preamplifier 401 and the multichannel pulse amplitude analyzer 402, and the filter 403 is configured to filter the amplified energy information to reduce high-frequency noise without changing the energy information and maintain the characteristics of the energy information.

It should be noted that the signals output by the detectors are random, among which amplitude and time are the main physical quantities. The detectors convert the energy of the incident particles into electrical signals, and then the signals are amplified by the preamplifier and sent to the multichannel pulse amplitude analyzer for collection. In this process, noise will inevitably be introduced to affect the signals. Due to the influence of background noise in the environment and hardware noise of the electronic system on the signals, the energy resolution of the detectors will be affected and the measurement accuracy will be reduced. If the noise is too large, it may cause the multichannel pulse amplitude analyzer to be triggered incorrectly and generate invalid data. Therefore, the signals are filtered before the multichannel pulse amplitude analyzer reads, so as to reduce high-frequency noise without changing the signals, maintain the characteristics of the signals and improve the signal-to-noise ratio of the data.

Specifically, the filter 403 adopts moving average filtering method, that is, taking an average value of a total of N points prior an the amplitude value at the current moment as a filtered value at the current moment. The specific formula is as follows:

$$y_n = \frac{1}{N}\sum_{m=0}^{N-1} x_{n-m}$$

$x_n$ represents a discrete sequence of samples, $y_n$ represents a corresponding filtered data sequence, and N represents a number of points for calculating the average value.

When using the coincidence technique-based X-ray detection device in the embodiment of the present application to analyze composition, the specific operation principle is as follows:

The power supply outputs different voltages, so that the controllable X-ray excitation source outputs X-rays with continuously adjustable energy to the sample to be tested. X-rays with different energies interact with the sample to be tested to excite the sample and generate secondary X-rays with different energies. The SiC semiconductor detectors and SiPIN semiconductor detectors detect the secondary X-rays and send signals to the preamplifier. After the detected secondary X-rays are amplified by the preamplifier, the multichannel pulse amplitude analyzer performs analog-to-digital conversion and classification to obtain the energy information of secondary X-rays with different energies. The baseline recovery module performs baseline recovery on the energy information to obtain the true amplitude energy information to eliminate the baseline drift. The extraction module extracts the peak positions and peak energies of the true amplitude energy information. The effective energy information determination module extracts the time information of the four semiconductor detectors, takes the time point when the first energy information reaches or exceeds the set threshold as the initial time, selects the time window, and takes the true amplitude energy information within the time window as the effective energy information. The peak comparison module compares the effective energy information with the known X-ray energy in the calibration curve to determine the element type and content in the sample. The intensity fingerprint comparison module matches the intensity ratios calculated by the calculation module with the X-ray intensity ratios at different energy levels for the known elements to correct the element type and its relative content. Each element in the sample and the content value of each element are displayed through the display module. When the X-ray detection device provided by the present application is applied to ore composition analysis, it can realize the control of ore classification/desliming and other operations according to the composition analysis results, change the current production mode of the ore processing industry, and improve production efficiency.

The X-ray detection device in the above-mentioned embodiments uses SiC semiconductor detectors and SiPIN semiconductor detectors to detect secondary X-rays generated by exciting the sample to be tested by the X-rays, which can quickly and accurately detect the secondary X-rays, thereby improving the efficiency and accuracy of composition analysis.

Figure 3:
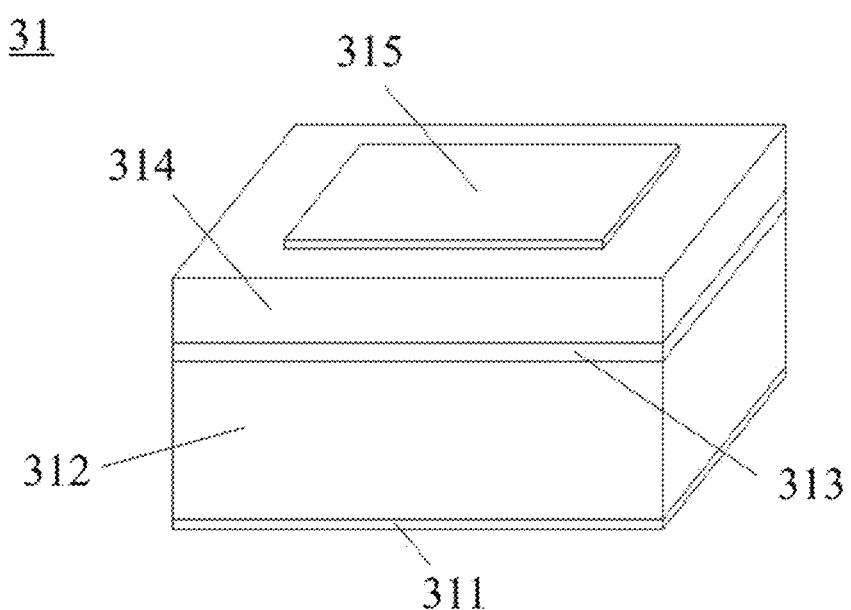
FIG. 3 is a structural schematic diagram of a SiC semiconductor detector of the coincidence technique-based X-ray detection device in the embodiment of the present application.

In some embodiments, the SiC semiconductor detectors used in the X-ray detection device is improved. As shown in FIG. 3, each of the SiC semiconductor detectors 31 comprises:
an ohmic electrode 311;
a 4H-SiC single crystal substrate 312, which is disposed on an upper surface of the ohmic electrode 311;
a buffer layer 313, which is grown on an upper surface of the 4H-SiC single crystal substrate 312, a doping concentration of the buffer layer 313 is $1 \times 10^{18}$ cm$^{-3}$, and the buffer layer 313 is made of the same material as the 4H-SiC single crystal substrate 312.
an epitaxial layer 314, which is grown on an upper surface of the buffer layer 313, a doping concentration of the epitaxial layer 314 is $5 \times 10^{14}$ cm$^{-3}$ and the epitaxial layer 314 is made of the same material as the 4H-SiC single crystal substrate 312.
a sensitive layer 315, which is a Schottky contact layer formed by evaporating a Ni film electrode on an upper surface of the epitaxial layer using a vacuum-thermal chemical vapor deposition method;
a cross-section of the sensitive layer 315 is square with a size of 7 mm×7 mm, and a cross-section of each of the 4H-SiC single crystal substrate 312, the ohmic electrode 311, the buffer layer 313, and the epitaxial layer 314 is square with a size of 10 mm×10 mm.

The sensitive layer is a Schottky contact layer formed by evaporating a Ni film electrode on the upper surface of the epitaxial layer by a vacuum-thermal chemical vapor deposition method, and the cross-sectional areas of the sensitive layer and the ohmic electrode are increased, which can achieve a low leakage current of $10^{-12}$ A, an ideal factor of 1.17 which close to 1 and a high rectification ratio of $10^{10}$, reduce dark current, have high reliability, have a large saturated electron mobility, and can improve the charge response speed of the SiC semiconductor detector. Therefore, the detectors can detect X-rays quickly and accurately.

In some embodiments, a preparation method of the ohmic electrode 311 is as follows: Ni and Pt materials are selected, and a Ni/Pt ohmic contact electrode with a Ni layer thickness of 80 nm and a Pt layer thickness of 100 nm is prepared by vacuum evaporation and magnetron sputtering, and annealed at 900° C. for 2 minutes in a vacuum chamber by a rapid thermal annealing system to obtain the ohmic electrode 311. The ohmic electrode is formed by thermal vacuum evaporation and vacuum rapid annealing to reduce defects of the ohmic contact interface.

In some embodiments, the 4H-SiC single crystal substrate 312 has a thickness of 350 μm and a resistivity of 0.023 Ω·cm, the buffer layer 313 has a thickness of 0.5 μm, the epitaxial layer 314 has a thickness of 30 μm, and the sensitive layer 315 has a thickness of 80 nm.

Figure 4:
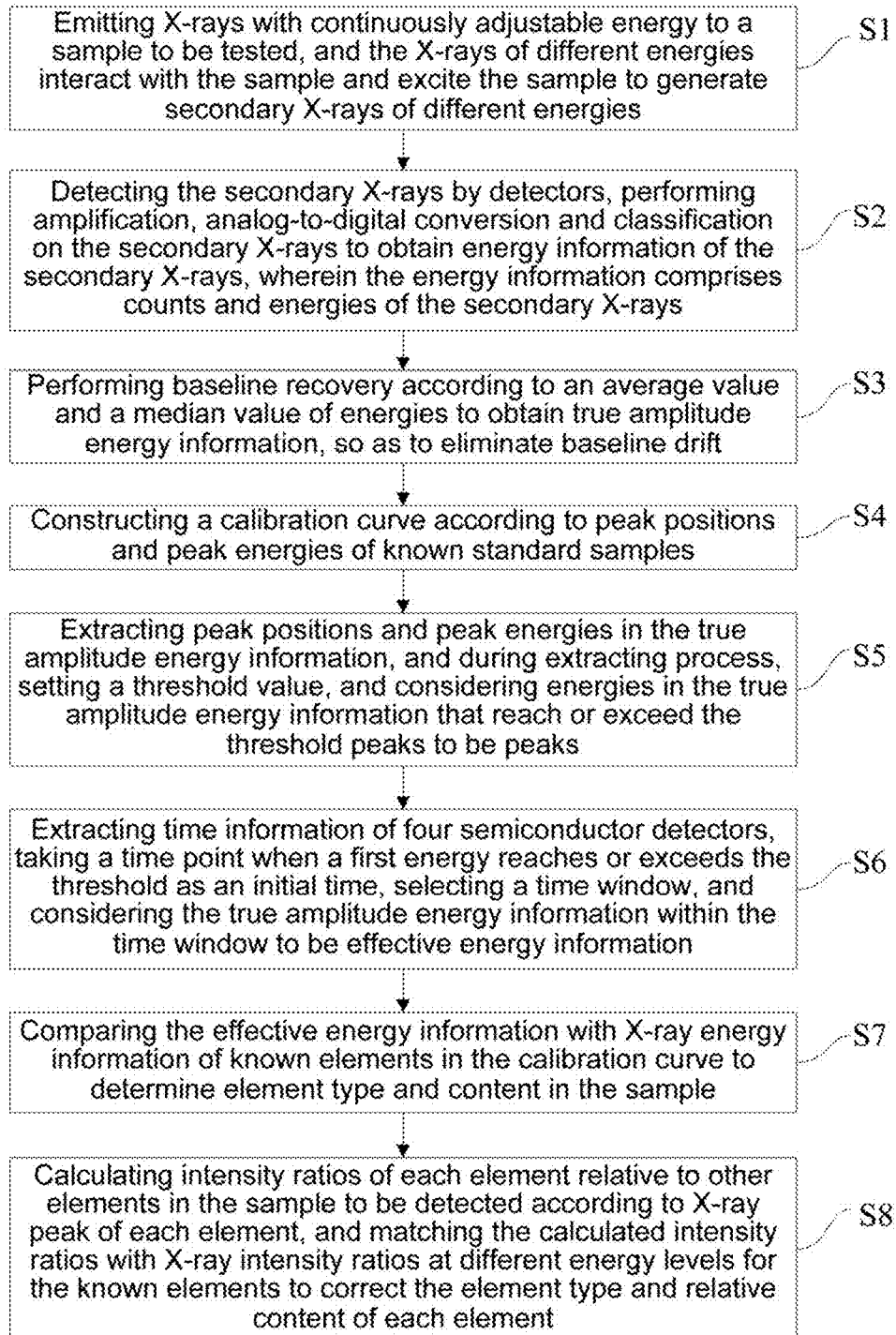
FIG. 4 is a flow chart of a composition analysis method in an embodiment of the present application.

The second aspect of the present application provides a composition analysis method, which uses the coincidence technique-based X-ray detection device described in any embodiment of the first aspect to perform analysis. As shown in FIG. 4, the composition analysis method comprises the following steps:

S1, emitting X-rays with continuously adjustable energy to a sample to be tested, and the X-rays of different energies interact with the sample and excite the sample to generate secondary X-rays of different energies;

S2, detecting the secondary X-rays by two SiC semiconductor detectors and two SiPIN semiconductor detectors that are spaced apart, performing amplification, analog-to-digital conversion and classification on the secondary X-rays to obtain energy information of the secondary X-rays, wherein the energy information comprises counts and energies of the secondary X-rays;

S3, performing baseline recovery according to an average value and a median value of the energies in the energy information to obtain true amplitude energy information, so as to eliminate baseline drift;

S4, constructing a calibration curve according to peak positions and peak energies of known standard samples;

S5, extracting peak positions and peak energies in the true amplitude energy information; in order to avoid missing peaks and ensure the accuracy of the composition analysis, a threshold is set, and energies in the true amplitude energy information that reach or exceed the threshold are considered to be peaks;

S6, extracting time information of the four semiconductor detectors, taking a time point when a first peak appears as an initial time, selecting a time window, and the true amplitude energy information within the time window is considered to be effective energy information;

S7. comparing the effective energy information with X-ray energy information of known elements in the calibration curve to determine element type and content in the sample.

In some embodiments, in step S3, calculate absolute value of the difference between the average value and the median value of the energies in the energy information and stop calculation loop when the following formula is satisfied:

$$|B_{ave}-B_{med}|<\delta_B$$

where $B_{ave}$ is the average value of the energies, $B_{med}$ is the median of the energies, $\delta_B$ is a minimum difference (a parameter of the above formula) with values ranging from 0.1 to 1; when the median value and the average value satisfy the above formula, take the median value or the average value as the baseline level, and subtract the median value or the average value from the energies to obtain the true amplitude energy information; when the above formula is not satisfied, $\delta_B$ times of the data is deducted from the original data set and then the calculation loop is repeated until the formula is satisfied.

In some embodiments, the composition analysis method further comprises step S8: calculating intensity ratios of each element relative to other elements in the sample to be detected according to X-ray peak of each element, and matching the calculated intensity ratios with the X-ray intensity ratios at different energy levels for the known elements to correct the element type and relative content of each element. It should be noted that for samples containing multiple elements, the intensity ratios of the X-ray energy levels of each element can be used to more accurately analyze the existence and relative content of the elements, providing a more detailed solution for the analysis of complex sample.

The composition analysis method in the above-mentioned embodiment detects the secondary X-rays generated by the sample to be tested when excited by X-rays through multiple detectors such as SiC semiconductor detectors and SiPIN semiconductor detectors. It can quickly and accurately detect the secondary X-rays, thereby improving the efficiency and accuracy of composition analysis.

The above-mentioned embodiments are used to explain the present invention, rather than to limit the present invention. Within the spirit of the present invention and the protection scope of the claims, any modification and change made to the present invention will fall into the protection scope of the present invention.

The invention claimed is:

1. A coincidence technique-based X-ray detection device, comprising:
   a sample holding device, which is used for holding a sample to be detected;
   an excitation unit, which is arranged above the sample holding device, and is configured to output X-rays with a continuously adjustable energy that interact with the sample to be detected, so as to excite the sample and generate secondary X-rays;
   detectors, which are configured to detect signals of the secondary X-rays, the detectors comprise two SiC semiconductor detectors and two SiPIN semiconductor detectors, and the detectors are spaced apart and are arranged circumferentially around the sample holding device;
   a signal processing unit, which is configured to perform an amplification, an analog-to-digital conversion, and a classification on the detected signals to obtain energy information;
   a data processing device, which is connected to the signal processing unit, and is configured to perform an analysis and a calculation according to the energy information, and determine an element type and a content in the sample to be tested, the data processing device comprises a processor and a memory, and the processor is configured to execute following program modules stored in the memory:
   a storage module, which is configured to store known elements and X-ray energy information of the known elements;
   a baseline recovery module, which is configured to perform a baseline recovery according to an average value and a median value of energies in the energy information to obtain true amplitude energy information so as to eliminate a baseline drift;
   a calibration curve construction module, which is configured to construct a calibration curve according to peak positions and peak energies of known standard samples;
   an extraction module, which is configured to extract peak positions and peak energies in the true amplitude energy information, wherein a threshold is set in the extraction module, and energies in the true amplitude energy information that reach or exceed the threshold are considered to be peaks;
   an effective energy information determination module, which is configured to extract time information of the detectors, and take a time point when a first energy in the true amplitude energy information reaches or exceeds the threshold as an initial time, select a time window, and the true amplitude energy information within the time window is considered to be effective energy information; and
   a peak comparison module, which is configured to compare the effective energy information with the X-ray energy information of the known elements in the calibration curve to determine the element type and the content in the sample.

2. The X-ray detection device according to claim 1, wherein the baseline recovery module is configured to end a calculation loop when the average value and the median value of the energies in the energy information satisfy following formula:

$$|B_{ave}-B_{med}|<\delta_B$$

where $B_{ave}$ is the average value of the energies, $B_{med}$ is the median value of the energies, $\delta_B$ is a minimum difference with values ranging from 0.1 to 1; when the average value and the median value satisfy the above formula, take the average value or the median value as a baseline level, and subtract the average value or the median value from the energies to obtain the true amplitude energy information; when the above formula is not satisfied, $\delta_B$ times of data is deducted from original data set and then the calculation loop is repeated until the above formula is satisfied.

3. The X-ray detection device according to claim 1, wherein the storage module further stores X-ray intensity ratios at different energy levels for the known elements, and the processor is further configured to execute following program modules stored in the memory:
   a calculation module, which is configured to calculate intensity ratios of each element relative to other elements in the sample to be detected according to an X-ray peak of each element;
   an intensity fingerprint comparison module, which is configured to match the calculated intensity ratios with the X-ray intensity ratios at different energy levels for the known elements to correct the element type and a relative content of each element.

4. The X-ray detection equipment according to claim 3, wherein
the data processing device is a host computer, and the data processing device further comprises a display module, the display module is connected to the intensity fingerprint comparison module, and the display module is configured to display the element type and the relative content of each element.

5. The X-ray detection device according to claim 1, wherein the sample holding device comprises:
a sample container, which is used for holding the sample to be tested; and
a sliding unit, which comprises a slide groove arranged at an edge of the sample container and four sliding members arranged at intervals, bottoms of the sliding members are placed in the slide groove and are capable of sliding along the slide groove, the detectors are respectively installed on the four sliding members.

6. The X-ray detection device according to claim 1, wherein the excitation unit comprises:
a power supply, which is used to output different voltages; and
a controllable X-ray excitation source, which is electrically connected to the power supply, and is configured to output X-rays with a continuously adjustable energy according to different voltages output by the power supply, so that the X-rays interact with the sample to be tested and excite the sample to generate the secondary X-rays.

7. The X-ray detection device according to claim 1, wherein the signal processing unit comprises:
a preamplifier, which is configured to amplify the secondary X-rays detected by the detectors; and
a multichannel pulse amplitude analyzer, which is configured to perform an analog-to-digital conversion and a classification on amplified secondary X-rays to obtain the energy information of the secondary X-rays, wherein the energy information comprises counts and energies of the secondary X-rays.

8. The X-ray detection device according to claim 7, wherein the signal processing unit further comprises a filter connected between the preamplifier and the multichannel pulse amplitude analyzer, and the filter adopts moving average filtering, and is configured to take an average value of a total of N points prior to an amplitude value at a current moment as a filtered value at the current moment, and a specific formula is as follows:

$$y_n = \frac{1}{N}\sum_{m=0}^{N-1} x_{n-m}$$

$x_n$ represents a discrete sequence of samples, $y_n$ represents a corresponding filtered data sequence, and N represents a number of points for calculating the average value.

9. The X-ray detection device according to claim 1, wherein each of the two SiC semiconductor detectors comprises:
an ohmic electrode;
a 4H-SiC single crystal substrate, which is disposed on an upper surface of the ohmic electrode;
a buffer layer, which is grown on an upper surface of the 4H-SiC single crystal substrate, a doping concentration of the buffer layer is $1\times10^{18}$ cm$^{-3}$, and the buffer layer is made of same material as the 4H-SiC single crystal substrate;
an epitaxial layer, which is grown on an upper surface of the buffer layer, a doping concentration of the epitaxial layer is $5\times10^{14}$ cm$^{-3}$, and the epitaxial layer is made of same material as the 4H-SiC single crystal substrate; and
a sensitive layer, which is a Schottky contact layer formed by evaporating a Ni film electrode on an upper surface of the epitaxial layer by a vacuum-thermal chemical vapor deposition method,
wherein a cross section of the sensitive layer is a square of 7 mm×7 mm, and a cross section of each of the 4H-SiC single crystal substrate, the ohmic electrode, the buffer layer, and the epitaxial layer is a square of 10 mm×10 mm.

10. The X-ray detection device according to claim 9, wherein a preparation method of the ohmic electrode is: selecting Ni and Pt materials, using vacuum evaporation and magnetron sputtering to prepare a Ni/Pt ohmic contact electrode with a Ni layer having a thickness of 80 nm and a Pt layer having a thickness of 100 nm, and annealing at 900° C. for 2 minutes in a vacuum chamber through a rapid thermal annealing system to obtain the ohmic electrode.

11. The X-ray detection device according to claim 9, wherein the 4H-SiC single crystal substrate has a thickness of 350 μm and a resistivity of 0.023 Ω·cm, the buffer layer has a thickness of 0.5 μm, the epitaxial layer has a thickness of 30 μm, and the sensitive layer has a thickness of 80 nm.

12. A composition analysis method, which uses the coincidence technique-based X-ray detection device according to claim 1 to perform an analysis, comprising following steps:
S1, emitting X-rays with a continuously adjustable energy to a sample to be tested, and the X-rays of different energies interact with the sample and excite the sample to generate secondary X-rays of different energies;
S2, detecting the secondary X-rays by two SiC semiconductor detectors and two SiPIN semiconductor detectors that are spaced apart, performing an amplification, an analog-to-digital conversion, and a classification on the secondary X-rays to obtain energy information of the secondary X-rays, wherein the energy information comprises counts and energies of the secondary X-rays;
S3, performing a baseline recovery according to an average value and a median value of the energies in the energy information to obtain true amplitude energy information, so as to eliminate a baseline drift;
S4, constructing a calibration curve according to peak positions and peak energies of known standard samples;
S5, extracting peak positions and peak energies in the true amplitude energy information, and during an extracting process, setting a threshold value, and considering energies in the true amplitude energy information that reach or exceed the threshold value to be peaks;
S6, extracting time information of the two SiC semiconductor detectors and the two SiPIN semiconductor detectors, taking a time point when a first energy in the true amplitude energy information reaches or exceeds the threshold value as an initial time, selecting a time window, and considering the true amplitude energy information within the time window to be effective energy information; and S7, comparing the effective energy information with X-ray energy information of known elements in the calibration curve to determine an element type and a content in the sample.

13. The composition analysis method according to claim 12, wherein step S3 further comprises ending a calculation loop when the average value and the median value of the energies in the energy information satisfy following formula:

$$|B_{ave}-B_{med}|<\delta_B$$

where $B_{ave}$ is the average value of the energies, $B_{med}$ is the median value of the energies, SB is a minimum difference with values ranging from 0.1 to 1; when the average value and the median value satisfy the above formula, taking the average value or the median value as a baseline level, and subtract the average value or the median value from the energies to obtain the true amplitude energy information; when the above formula is not satisfied, $\delta_B$ times of data is deducted from original data set and the calculation loop is repeated until the above formula is satisfied.

14. The composition analysis method according to claim 12, further comprising a following step:

S8, calculating intensity ratios of each element relative to other elements in the sample to be detected according to an X-ray peak of each element, and matching the calculated intensity ratios with X-ray intensity ratios at different energy levels for the known elements to correct the element type and a relative content of each element.

* * * * *